US012730802B2

(12) United States Patent
Kanneganti et al.

(10) Patent No.: US 12,730,802 B2
(45) **Date of Patent: *Sep. 8, 2026**

(54) DETERMINATION OF HIERARCHICAL CODES

(71) Applicant: SAP SE, Walldorf (DE)

(72) Inventors: Raghuveer Kanneganti, Prosper, TX (US); Neda Edalat, San Jose, CA (US); Shrinivas Kaza, Danville, CA (US); Harish Kumar Kadirompalli Venkatashivareddy, San Jose, CA (US); Harshit Kumar, Tracy, CA (US); Phiroze Dastoor, Redwood City, CA (US); Taiwo Alabi, Berkeley, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/084,042

(22) Filed: Mar. 19, 2025

(65) Prior Publication Data

US 2025/0217354 A1 Jul. 3, 2025

Related U.S. Application Data

(63) Continuation of application No. 18/524,810, filed on Nov. 30, 2023, now Pat. No. 12,282,476.

(51) Int. Cl.
*G06F 16/242* (2019.01)
*G06F 16/248* (2019.01)
*G06F 16/28* (2019.01)

(52) U.S. Cl.
CPC .......... *G06F 16/243* (2019.01); *G06F 16/248* (2019.01); *G06F 16/282* (2019.01)

(58) Field of Classification Search
None
See application file for complete search history.

(56) References Cited

U.S. PATENT DOCUMENTS 10,417,221 B2 * 9/2019 Kutsch .................. G06F 16/838
12,282,476 B1 * 4/2025 Kanneganti ........... G06F 16/282
12,423,313 B1 * 9/2025 Cui ..................... G06F 16/9024
(Continued)

OTHER PUBLICATIONS

The Use of Phrases from Query Texts in Information Retrieval (Year: 2000).*
(Continued)

*Primary Examiner* — Kim T Nguyen
(74) *Attorney, Agent, or Firm* — Buckley, Maschoff & Talwalkar LLC

(57) ABSTRACT

Systems and methods include reception of a plurality of item descriptions associated with a respective hierarchical code which includes a plurality of group codes, extraction of a respective plurality of phrases from each item description, assignment, for each item description, a phrase embedding determined for each of the extracted respective plurality of phrases to each of the plurality group codes included in the hierarchical code associated with the item description, generation of a composite embedding for each of the plurality of group codes based on the phrase embeddings assigned to the group code, and storage of each composite embedding in association with the group code for which the composite embedding was generated.

11 Claims, 10 Drawing Sheets

(56) References Cited

U.S. PATENT DOCUMENTS

| | | | | |
|---|---|---|---|---|
| 12,541,783 | B2 * | 2/2026 | Wang | G06F 16/9538 |
| 2016/0378821 | A1 * | 12/2016 | Kutsch | G06F 16/90324 707/779 |
| 2017/0032087 | A1 * | 2/2017 | Tanase | G06F 16/248 |
| 2024/0419695 | A1 * | 12/2024 | Matson | G06F 40/40 |
| 2025/0217354 | A1 * | 7/2025 | Kanneganti | G06F 16/282 |
| 2025/0253016 | A1 * | 8/2025 | Hafen | G06F 16/248 |
| 2025/0298835 | A1 * | 9/2025 | Mahajan | G06F 16/435 |
| 2026/0087008 | A1 * | 3/2026 | Naqvi | G06F 16/24542 |
| 2026/0093690 | A1 * | 4/2026 | Kondapi | G06F 16/243 |

OTHER PUBLICATIONS

Compositional Embeddings Using Complementary Partitions for Memory-Efficient Recommendation Systems (Year: 2020).*

* cited by examiner

FIG. 3

| Group Code | Representative Embedding |
|---|---|
| 11 | [0, 56, ... ] |
| 12 | [0, 75, ... ] |
| 30 | [0, 86, ... ] |
| 45 | [0, 56, ... ] |
| ... | |
| ... | |
| ... | |
| 1122 | [0, 56, ... ] |
| 1221 | [0, 75, ... ] |
| 3045 | [0, 86, ... ] |
| 4556 | [0, 56, ... ] |
| ... | |
| ... | |
| ... | |
| 112233 | [0, 56, ... ] |
| 112255 | [0, 75, ... ] |
| 112278 | [0, 86, ... ] |
| 123456 | [0, 56, ... ] |
| ... | |
| ... | |
| ... | |
| 11223344 | [0, 56, ... ] |
| 11225566 | [0, 75, ... ] |
| 30527896 | [0, 86, ... ] |
| 45012347 | [0, 56, ... ] |
| ... | |
| ... | |
| ... | |

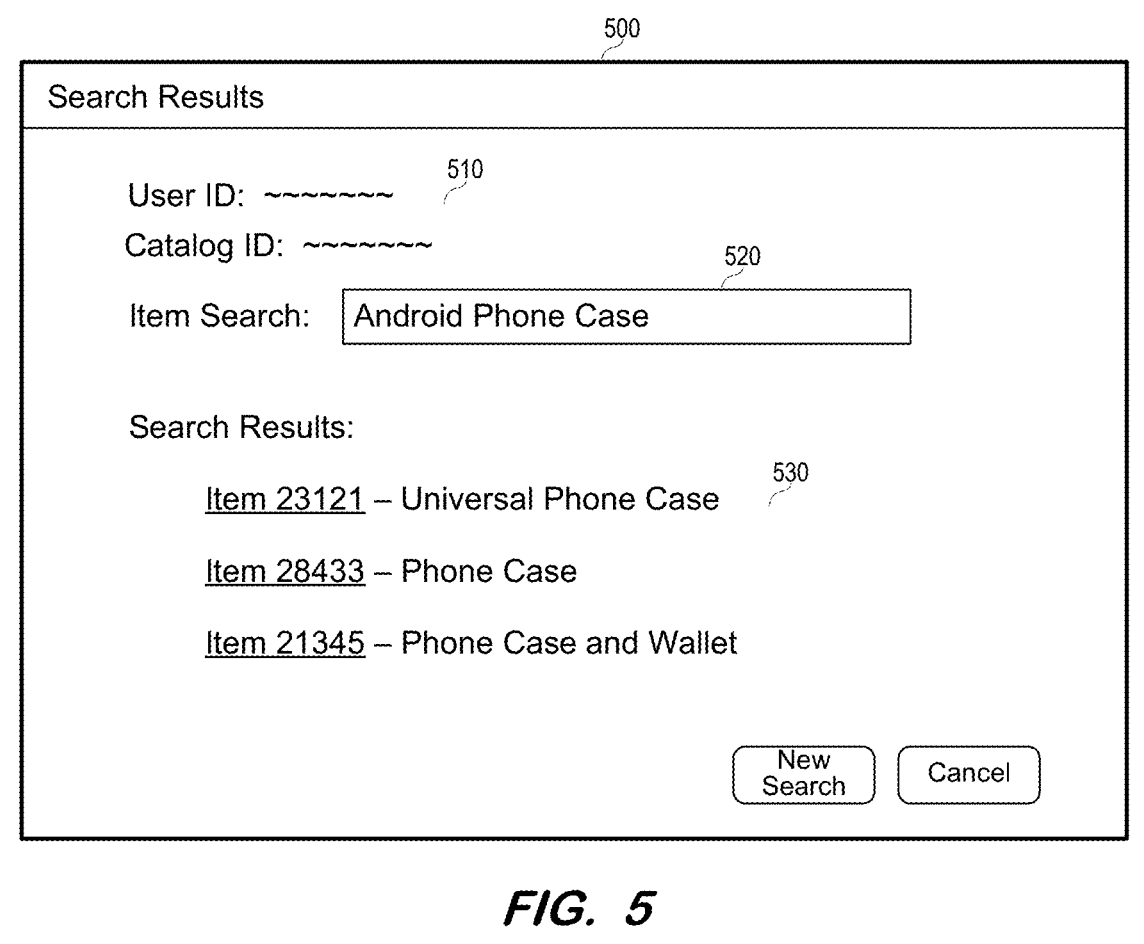

500

Search Results

User ID: ~~~~~~~ 510

Catalog ID: ~~~~~~~

Item Search: Android Phone Case 520

Search Results:

Item 23121 – Universal Phone Case 530

Item 28433 – Phone Case

Item 21345 – Phone Case and Wallet

New Search

Cancel

FIG. 5

DETERMINATION OF HIERARCHICAL CODES

CROSS-REFERENCE TO RELATED APPLICATIONS

This application claims priority to, and the benefit of, U.S. patent application Ser. No. 18/524,810, filed Nov. 30, 2023, the contents of which are incorporated herein by reference for all purposes.

BACKGROUND

Modern organizations use computing systems for a multitude of tasks. Comprehensive enterprise resource planning systems may be used within most functional units of an organization, including but not limited to manufacturing and logistics, customer resource management, supply chain management, human resource management, and finance. For example, a computing system may allow users to search for items (e.g., products, documents, media, reports, raw materials, inventory) used or for use within such functional units.

Generally, a search system compares the search terms of a user search request against known text associated with various items to determine search results consisting of a list of items, possibly ordered according to relevance. The text associated with some items may include a code indicating a category to which the item belongs. In such a case, it is desirable to identify a category from the search terms and to use the identified category to assist generation and/or ordering of the search results.

Some systems use machine learning models to attempt to identify an item category code from search terms. Such models are trained based on usage log data (e.g., search terms and associated item selection events), synthetically-generated search terms and associated category codes, and manually-curated training data. These models suffer from a "cold start" problem which prevents their effective use until sufficient usage log data has been generated. Moreover, a model trained for one tenant cannot be used for another tenant, due to confidentiality concerns, differences in usages, and differences in how a same item may be described by different tenants.

Systems are desired to efficiently determine a category code based on user search terms while addressing at least one of the above-described issues.

BRIEF DESCRIPTION OF THE DRAWINGS

FIG. 3 is a user interface to input a search query according to some embodiments.

FIG. 5 is a user interface to present search results according to some embodiments.

DETAILED DESCRIPTION

The following description is provided to enable any person in the art to make and use the described embodiments. Various modifications, however, will be readily-apparent to those in the art.

According to some embodiments, a catalog of items is acquired, where each item is associated with a text description, a hierarchical code and possibly other information such as price, language, etc. Representative vectors for each of a plurality of hierarchical group codes are determined based on the catalog. At query time, user-generated search terms are converted into a vector which is compared against the representative vectors to determine one or more corresponding hierarchical group codes. The one or more corresponding hierarchical group codes may be provided to a search engine along with the search terms to skew the search results toward the one or more corresponding hierarchical group codes.

Embodiments may improve prediction accuracy over prior systems by reducing the prediction classes (i.e., the hierarchical group codes) to those actually used by a tenant and generating the group representation vectors based on the manner in which the prediction classes are used by the tenant. Advantageously from a confidentiality standpoint, each tenant's own catalog is used to generate its tenant-specific group representation vectors and neither catalogs nor tenant-specific group representation vectors are shared amongst tenants. Consequently, the functional performance of group representation vectors generated based on one tenant's catalog will not impact the functional performance of group representation vectors generated based on another tenant's catalog.

Embodiments may address the cold start problem by providing accurate code predictions without requiring any usage data. Maintenance costs may also be reduced because only vector representations, rather than trained models, are stored per-tenant (and per language, if appropriate).

Figure 1:
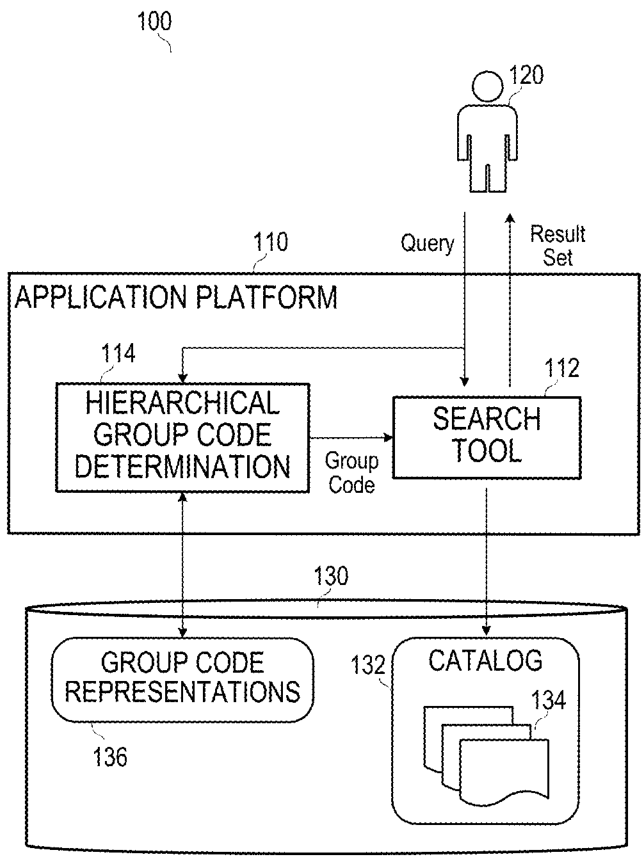
FIG. 1 is a block diagram illustrating a search architecture according to some embodiments.

FIG. 1 is a block diagram of a search architecture according to some embodiments. Each of the illustrated components may be implemented using any suitable combinations of computing hardware and/or software that are or become known. In some embodiments, two or more components are implemented by a single computing device.

The components of system 100 may be on-premise, cloud-based (e.g., in which computing resources are virtualized and allocated elastically), distributed (e.g., with distributed storage and/or compute nodes) and/or deployed in any other suitable manner. Each component may comprise disparate cloud-based services, a single computer server, a cluster of servers, and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Application platform 110 may provide a runtime environment for executing one or more applications. According to one non-exhaustive example, the applications include a purchasing application which allows users such as user 120 to purchase items. The purchasing application may include program code of search tool 112 and hierarchical group code determination component 114.

Search tool 112 generates search results based on received search terms and stored data. Search tool 112 may comprise any suitable search engine that is or becomes known, including but not limited to the Solr and Elasticsearch search engines. Such search engines may index stored data and expose the data for search.

Hierarchical group code determination component 114 may determine one or more group codes based on search terms as described below and provide the one or more group codes to search tool 112. Search tool 112 may generate search results based on the search terms and the one or more group codes. The generated search results may differ from search results which search tool 112 would have generated in the absence of the one or more group codes. According to some embodiments, search tool 112 provides functionality for modifying, or boosting, search results based on received information.

Storage system 130 may comprise one or more standalone or distributed databases, data warehouses, object stores, or any other storage systems that are or become known. Storage system 130 stores catalog 132 containing text entries 134. Each of text entries 134 is associated with an item, such as but not limited to a product for purchase. A text entry 134 associated with a given item may include a hierarchical group code associated with the item and may also include a description, price, etc. Catalog 132 and its text entries 134 may be uploaded to storage system 130 by an organization of which user 120 is a member (e.g., an employee). The hierarchical group code associated with an item may be assigned by the organization, by a producer of the item, or otherwise.

As used herein, a hierarchical group refers to a particular logical group within a hierarchy of logical groups. For example, a hierarchy of groups may include GroupA and GroupB at a top level of the hierarchy, GroupA1 and GroupA2 as immediate descendants of GroupA, GroupB1 and GroupB2 as immediate descendants of GroupB, Group A11 and Group A12 as immediate descendants of GroupA1, Group A21 and Group A22 as immediate descendants of GroupA2, Group B11 and Group B12 as immediate descendants of GroupB1, and Group B21 and Group B22 as immediate descendants of GroupB2.

Each hierarchical group is associated with a hierarchical group code, and the hierarchical group code associated with a given group indicates all ancestor groups of the given group within the hierarchy. In one example, in a three-level hierarchy using a three-digit hierarchical group code, each top-level group is represented by a one-digit hierarchical group code in which the digit indicates the top-level group. Each middle-level group is represented by a two-digit hierarchical group code in which the first digit indicates its ancestor top-level group and the second digit indicates the middle-level group. Finally, each bottom-level group is represented by a three-digit hierarchical group code in which the first digit indicates its ancestor top-level group, the second digit indicates its ancestor middle-level group and the third digit indicates the bottom-level group.

Continuing the above example, the hierarchical group code of GroupA according to such a scheme may be 1, the hierarchical group code of GroupB may be 2, the hierarchical group code of GroupA1 may be 11, the hierarchical group code of GroupA2 may be 12, the hierarchical group code of GroupB1 may be 21, and the hierarchical group code of GroupB2 may be 22. Moreover, the hierarchical group codes of GroupA11, GroupA12, GroupA21, GroupA22, GroupB11, GroupB12, GroupB21, and GroupB22 may be 111, 112, 121, 122, 211, 212, 221 and 222, respectively. As noted, the hierarchical group code associated with a given group indicates all ancestor groups of the group within the hierarchy.

Storage system also stores group code representations 136 according to some embodiments. Group code representations 136 associate each hierarchical group code with a corresponding numerical representation. Each numerical representation may comprise a multi-dimensional numerical vector, referred to herein as an embedding. The particular numerical representation associated with each hierarchical group code may be determined as described below based on text entries 134.

In operation according to some embodiments, user 120 accesses a Web page hosted by an application executing on application platform 110. User 120 then inputs a query including search terms into the Web page. Search tool 112 receives the query and conducts a search of catalog 132 to identify a plurality of items based on the search terms.

Hierarchical group determination component 114 also receives the search terms. Hierarchical group determination component 114 determines an embedding based on the search terms and identifies one or more of group code representations 136 based on the determined embedding. For example, component 114 may identify, for each level of the group hierarchy, a representation 136 which is most-similar to the determined embedding. In another example, component 114 identifies several of representations 136 which are most-similar to the determined embedding. Hierarchical group determination component 114 determines the group codes associated with each identified representation and transmits one or more of the group codes to search tool 112.

Search tool 112 may boost the search results based on the received one or more group codes. In one example, search tool 112 may boost the assigned relevance of items within the search results if those items are associated with the one or more group codes. An item may be considered to be associated with a group code if, for example, it is assigned to the same group code in its text entry 134, its group is a descendant of the group assigned to the group code and/or it shares an ancestor group with the group assigned to the group code. The degree to which an item is boosted in the search results based on a received group code may depend, in some embodiments, on the degree to which the group to which the item is assigned is related to the group represented by the group code. According to some embodiments, search tool 112 boosts the search results by incorporating the received one or more group codes into its search algorithm, rather than by generating search results and then modifying the search results based on the one or more group codes.

Figure 2:
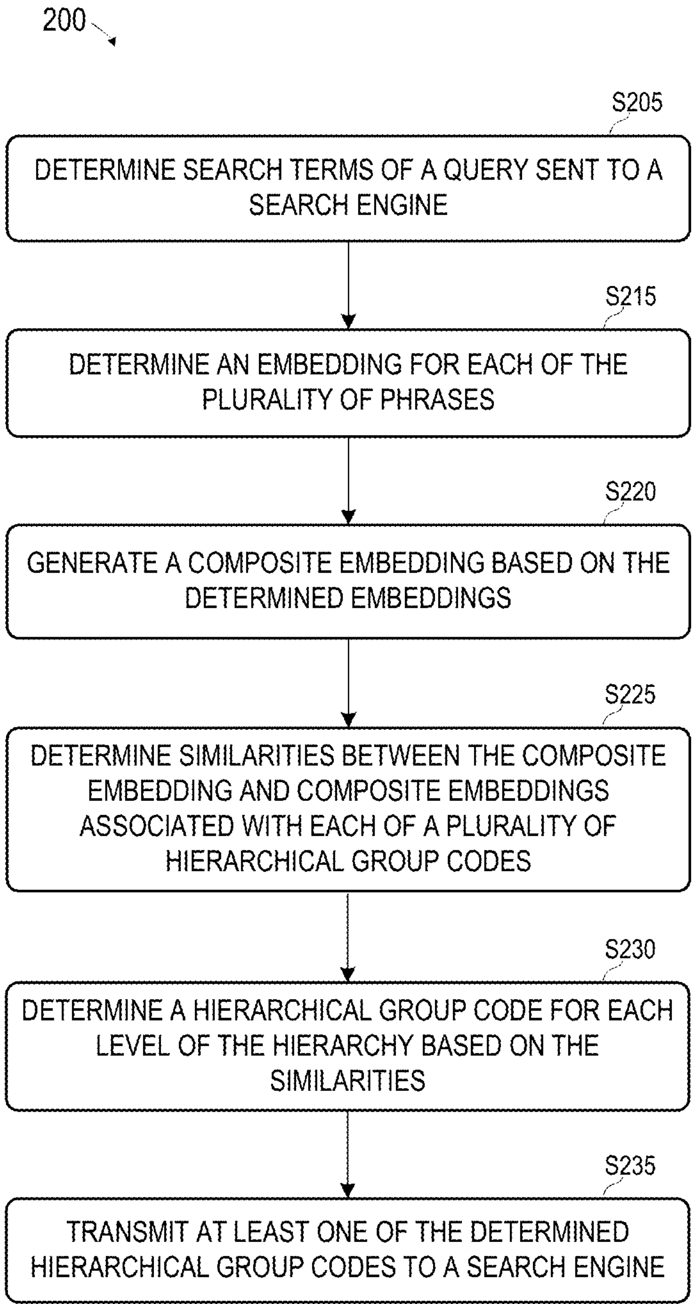
FIG. 2 is a flow diagram of a process to determine a hierarchical group code based on search terms according to some embodiments.

FIG. 2 comprises a flow diagram of process 200 to determine a hierarchical group code based on search terms according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Figure 3:
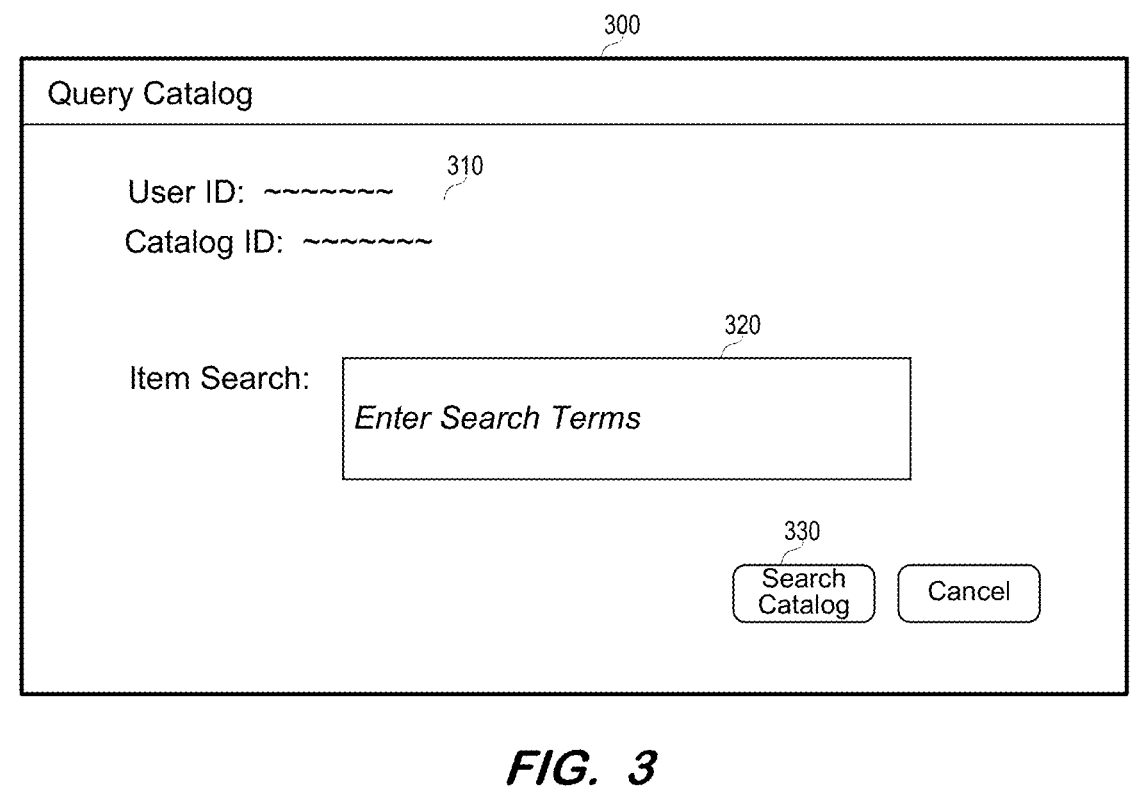

Initially, at S205, search terms of a query sent to a search engine are determined. According to some embodiments, a user submits search terms of a query to a search engine at S205. FIG. 3 is a user interface to input a search query according to some embodiments. In one example, a user operates a Web browser to access a search page of a purchasing application via a corresponding Uniform Resource Locator (URL) and the purchasing application returns a Web page presenting interface 300.

Interface 300 includes fields 310 identifying the user (who may in turn be associated with a particular tenant of the application) and a catalog of items to be searched. The user operates an input device (e.g., a keyboard) to enter search terms into input field 320. The search terms may include one or more words, wildcard characters and/or other operators as is known in the art. Selection of control 330 causes the search terms to be transmitted to a corresponding search engine. The transmitted search terms may be provided at S205 to a component executing process 200, which may comprise the search engine itself or a separate component.

A plurality of embeddings are generated from the search terms at S215. Each determined embedding is a multi-dimensional numerical vector as described above. The embedding of a given search term may, for example, be generated by a sentence-BERT embedding model. Next, at S220, a composite embedding is determined based on all the embeddings determined at S215. The composite embedding may comprise, for example, a mean of the determined embeddings or a centroid of the determined embeddings, but embodiments are not limited thereto. The composite embedding is a representation of the search terms of the query.

Figure 4:
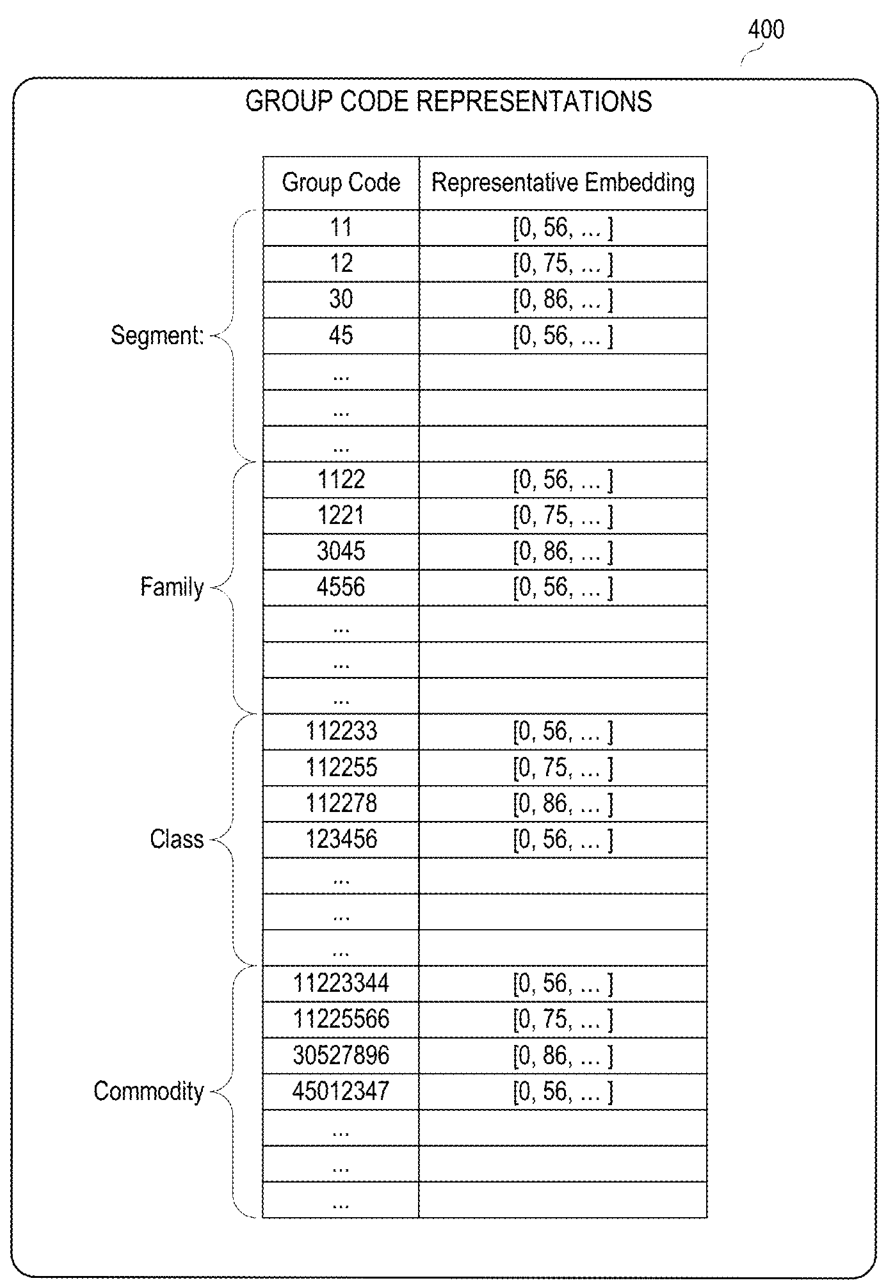
FIG. 4 is a tabular representation of hierarchical group codes and associated vector representations according to some embodiments.

At S225, similarities between the composite embedding and composite embeddings associated with each of a plurality of hierarchical group codes are determined. FIG. 4 is tabular representation 400 of hierarchical group codes and associated representative embeddings according to some embodiments.

The groups of representation 400 represent United Nations Standard Products and Services Code (UNSPSC) groups, but embodiments are not limited thereto. The UNSPSC is a taxonomy of products and services. It defines a four-level hierarchy coded as an eight-digit number. The levels of the hierarchy, from top to bottom, are Segment, Family, Class and Commodity. The first two digits of a UNSPSC hierarchical code indicate the Segment-level group of a product or service, the next two digits indicate the Family-level group of the product or service, the next two digits indicate the Class-level group of the product or service, and the next two digits indicate the Commodity-level group of the product or service. Embodiments may operate in conjunction with any hierarchical or product service representations of any length.

Group code representations 400 associate a representative embedding with each of a plurality of group codes. According to some embodiments and as will be described below, the representative embeddings are determined based on the catalog of item entries which is currently being searched. The embeddings may be determined using the same embeddings generator and embedding composition algorithm which were used at S215-S220 to generate the composite embedding from the search terms.

The composite embedding may be compared with each of the stored embeddings using any similarity metric that is or becomes known. After such comparison, each of the stored embeddings is associated with a similarity score which indicates how similar the stored embedding is to the composite embedding.

Next, at S230, a hierarchical group code is determined for each level of the group hierarchy based on the determined similarities. In the present example, S230 includes determining the Segment group code associated with the highest similarity score of all the Segment group codes, the Family group code associated with the highest similarity score of all the Family group codes, the Class group code associated with the highest similarity score of all the Class group codes, and the Commodity group code associated with the highest similarity score of all the Commodity group codes.

At least one of the determined hierarchical group codes is transmitted to a search engine at S235. The hierarchical group code associated with the highest similarity score may be transmitted along with its similarity score in some embodiments. Any suitable logic may be employed to determine which and how many hierarchical group codes to transmit based on their similarity scores. According to some embodiments, if a Segment-level hierarchical group code is associated with a similarity score of 0.80 and a Class-level hierarchical group code is associated with a similarity score of 0.79, the Class-level hierarchical group code may be transmitted to the search engine at S235. This logic relies on the fact that the Class-level hierarchical group code is significantly more specific to a particular item than the Segment-level hierarchical group code, and the increased specificity outweighs the slightly smaller similarity.

The search engine may then boost the search results based on the one or more received hierarchical group codes as described above. In this regard, the received codes are intended to represent the item for which the user intended to search via the input query, Accordingly, by boosting the search results based on the one or more received hierarchical group codes, the search engine may provide more desirable search results to the user than otherwise.

FIG. 5 depicts user interface 500 to present boosted search results according to some embodiments. As shown, the search terms 520 were "Android Phone Case" and search results 530 were retrieved from the catalog specified in fields 510. The items listed in search results 530 and/or their listed order may be different than what would have been presented in the absence of process 200.

Figure 6:
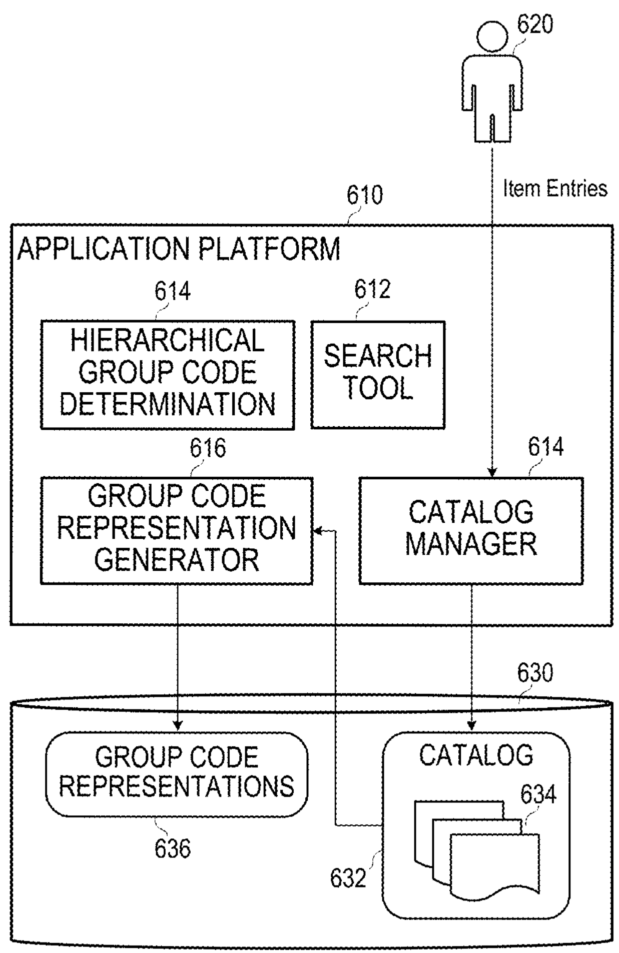
FIG. 6 is a block diagram illustrating a search architecture according to some embodiments.

FIG. 6 is a block diagram illustrating a search architecture according to some embodiments. The search architecture of FIG. 6 may provide the search functionality described above as well as generation of the group code representations (i.e., embeddings) used to provide the search functionality. Accordingly, components 610, 612, 614, 630, 632, 634 and 636 may be implemented similarly to the similarly-named components of FIG. 1.

Application platform 610 also includes catalog manager 614 to assist in creating a catalog such as catalog 632 and populating catalog 632 with item entries 634. For example, administrator 620 may access catalog manager to upload a catalog of item entries to storage 630. Application platform 610 further includes group code representation generator 616 to generate group code representations 636 based on item entries 634 of catalog 632.

Figure 7:
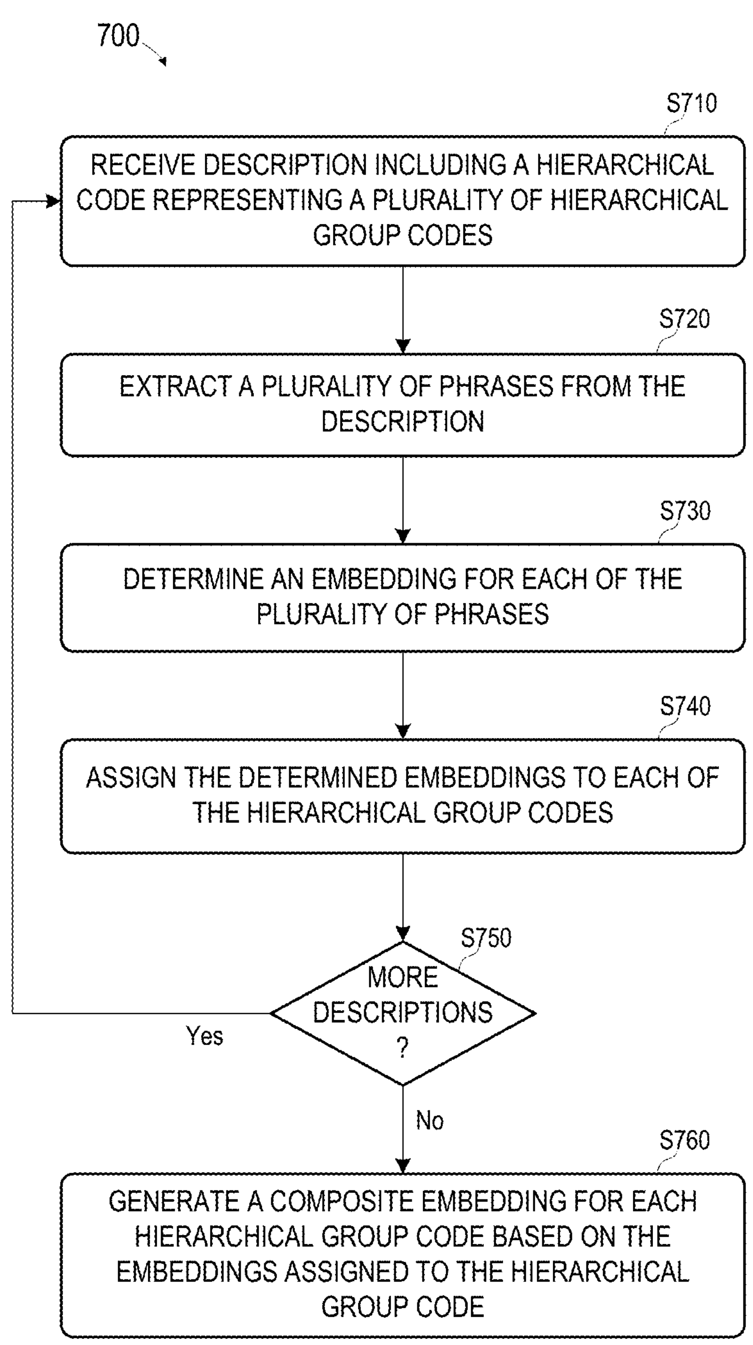
FIG. 7 is a flow diagram of a process to determine vector representations associated with hierarchical group codes according to some embodiments.

FIG. 7 is a flow diagram of process 700 to determine hierarchical group code representations according to some embodiments. Process 700 may therefore be performed by group code representation generator 616 according to some embodiments.

A description is received at S710. It will be assumed that the description includes text describing a product or service and includes a hierarchical code representing a plurality of hierarchical group codes. For example, the description may comprise a text entry of a product catalog as described herein and may be formatted in any suitable manner, including but not limited to a markup-language format. The hierarchical code may comprise, for example, an eight-digit code (e.g., 11223344) representing a plurality of hierarchical group codes (e.g., 11, 1122, 112233, 11223344).

Next, at S720 and S730, a plurality of phrases are extracted from the description and an embedding is determined for each of the plurality of phrases. Extraction at S720 may be performed by a keyword extraction system according to some embodiments. In one non-exhaustive example, the keyword extraction system may comprise KeyBERT, which uses BERT embeddings to generate keywords and key phrases as is known in the art. Embeddings may be determined from the extracted phrases using a same embeddings generator as will be used to generate embeddings from search terms during future searches.

The determined embeddings are assigned to each of the hierarchical group codes represented by the hierarchical code at S740. According to the above example of code 11223344, and assuming four phrases were extracted at S720 and four embeddings were generated therefrom at S730, each of the four embeddings is independently assigned to hierarchical group codes 11, 1122, 112233 and 11223344 at S740.

It is then determined at S750 whether additional descriptions remain. If so, flow returns to S710 and proceeds as described above with respect to a next description. Accordingly, flow may cycle between S710 and S750 for each text entry of an uploaded catalog until all text entries have been processed. At this point, many hierarchical group codes will be assigned many embeddings and flow proceeds to S760.

Figure 8:
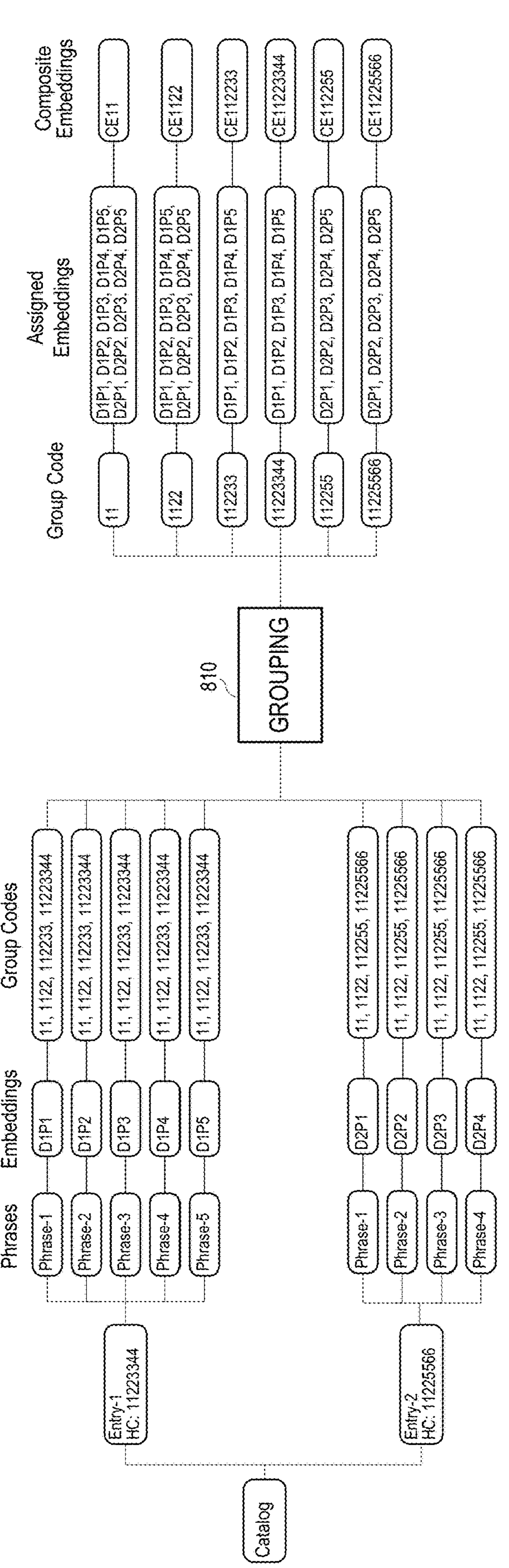
FIG. 8 illustrates determination of vector representations associated with hierarchical group codes according to some embodiments.

To assist the explanation of S760, FIG. 8 illustrates process 700 with respect to a catalog including two text entries, where each text entry is associated with a different item and a different hierarchical code. As shown, Entry-1 is associated with hierarchical code 11223344. Five phrases are extracted from Entry-1 at S720 and an embedding is determined based on each phrase at S730. At S740, each of embeddings D1P1, D1P2, D1P3, D1P4, D1P5 is assigned to each one of hierarchical group codes 11, 1122, 112233 and 11223344.

As also shown, Entry-2 is associated with hierarchical code 11225566. Four phrases are extracted from Entry-2 at S720, an embedding is determined based on each phrase at S730, and each of embeddings D2P1, D2P2, D2P3, D2P4 is assigned to each one of hierarchical group codes 11, 1122, 112255 and 11225566 at S750.

Next, at S760, a composite embedding is generated for each hierarchical group code based on the embeddings assigned to the hierarchical group code. For example, grouping component 810 identifies, for each group code, all of the embeddings assigned to the group code during execution of process 700. FIG. 8 shows each group code 11, 1122, 112233, 11223344, 112255 and 11225566 of the present example and, for each group code, all of the embeddings assigned to the group code. FIG. 8 also shows, for each hierarchical group code, a single composite embedding which is generated based on the embeddings assigned to the hierarchical group code. The composite embeddings may be generated using any suitable embedding composition algorithm. In some embodiments, the embedding composition algorithm is the same as will be subsequently-used to determine a composite embedding from received search terms.

Figure 9:
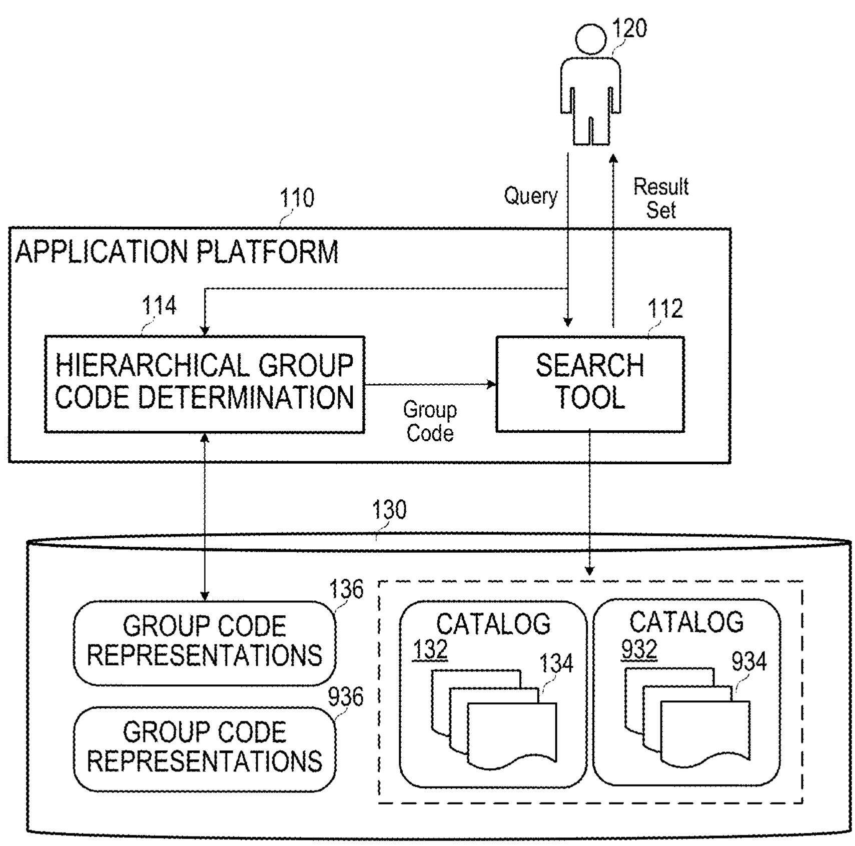
FIG. 9 is a block diagram illustrating a search architecture according to some embodiments.

The composite embeddings may then be stored in association with their corresponding hierarchical group codes as described above and as illustrated in FIG. 4. This stored data is described above as group code representations and is associated with a single set of text entries, e.g., of a single catalog. FIG. 9 illustrates an architecture including two catalogs 132 and 932 with corresponding text entries 134 and 934.

It will be assumed that each of catalogs 132 and 932 was uploaded to storage system 130 by a different tenant. Text entries 134 and 934 may be identical or may differ in any manner. It will also be assumed that group code representations 136 were generated based on catalog 132 and process 700, while group code representations 936 were generated based on catalog 932. According to some embodiments, search tool 112 determines which of catalogs 132 or 932 to be searched in response to a received query based on the tenant to which user 120 belongs. Similarly, hierarchical group code determination component 114 determines which one of group code representations 136 or 936 from which to compare embeddings based on the tenant to which user 120 belongs.

More particularly, if a user 120 logs in under the subscription of a first tenant and submits a first query to search tool 112, search tool 112 searches catalog 132 to determine search results and hierarchical group code determination component 114 determines a hierarchical group code corresponding to the search terms of the first query using group code representations 136. However, if a user 120 logs in under the subscription of a second tenant and submits a second query to search tool 112, search tool 112 searches catalog 932 to determine search results and hierarchical group code determination component 114 determines a hierarchical group code corresponding to the search terms of the second query using group code representations 936. Accordingly, the text entries of one catalog of one tenant do not affect the search results returned to users of another tenant.

Figure 10:
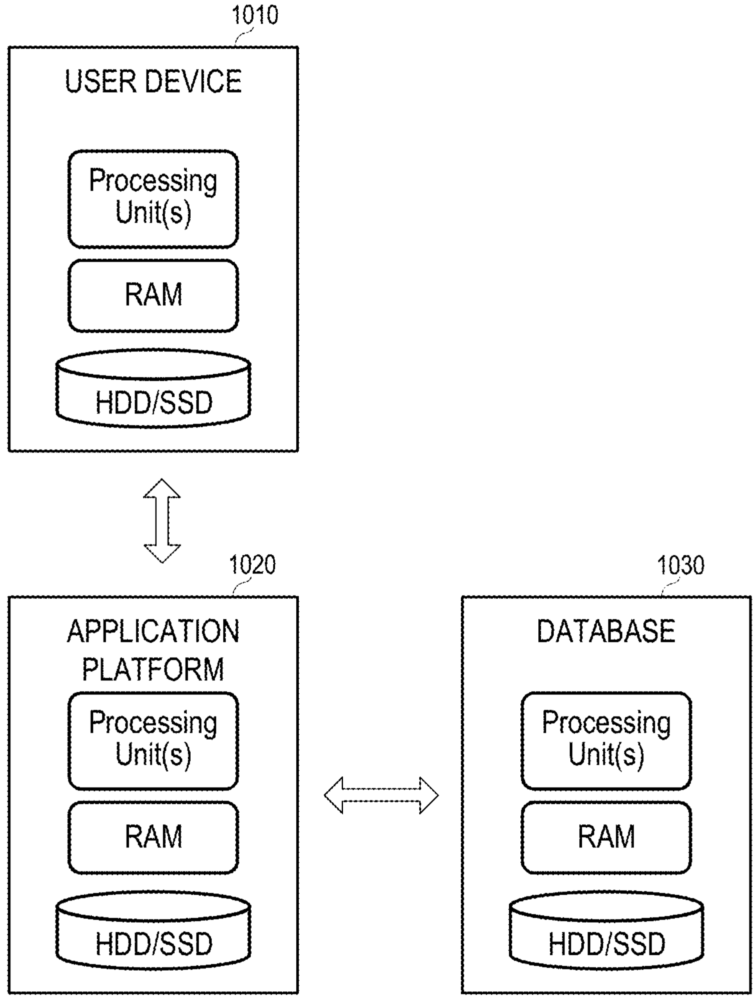
FIG. 10 is a block diagram of a cloud-based architecture according to some embodiments.

FIG. 10 is a diagram of a cloud-based implementation according to some embodiments. User device 1010 may comprise a local computing system operated by a user to access functionality of an application executing on application platform 1020. The application may search a catalog of items stored in database 1030 based on a search query received from the user and may generate search results based on hierarchical group codes determined based on search terms as described above.

Each of systems 1020 and 1030 may comprise cloud-based resources residing in one or more public clouds providing self-service and immediate provisioning, autoscaling, security, compliance and identity management features. Systems 1020 and 1030 may comprise servers or virtual machines of respective Kubernetes clusters, but embodiments are not limited thereto.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing processor-executable program code; and at least one processing unit to execute the processor-executable program code to cause the system to:

receive a plurality of item descriptions, each of the plurality of item descriptions associated with a respective hierarchical code, wherein each respective hierarchical code includes a plurality of group codes;

extract a respective plurality of phrases from each item description;

apply an embedding generator to each of the respective plurality of phrases extracted from each item description to generate a multi-dimensional numerical phrase embedding for each of the respective plurality of phrases extracted from each item description;

for each item description, assign each phrase embedding determined for each of the respective plurality of phrases extracted from the item description to each of the plurality group codes included in the hierarchical code associated with the item description;

generate a composite embedding for each of the plurality of group codes based on the phrase embeddings assigned to the group code and a composition algorithm;

store each composite embedding in association with the group code for which the composite embedding was generated;

receive a search query including search terms;

apply the embedding generator to each of the search terms to generate multi-dimensional numerical search term embeddings;

generate a search query composite embedding based on the search term embeddings and the composition algorithm;

determine a stored composite embedding based on the search query composite embedding;

determine a group code of the plurality of group codes which is stored in association with the determined stored composite embedding;

determine item descriptions associated with the determined group code; and generate search results based on the item descriptions.

2. The system of claim 1, the at least one processing unit to execute the processor-executable program code to cause the system to:

receive a second search query including second search terms;

apply the embedding generator to each of the second search terms to generate second multi-dimensional numerical search term embeddings;

generate a second search query composite embedding based on the second search term embeddings and the composition algorithm;

determine a second stored composite embedding based on the second search query composite embedding;

determine a second group code of the plurality of group codes which is stored in association with the determined second stored composite embedding;

determine second item descriptions associated with the determined second group code; and generate second search results based on the second item descriptions.

3. The system of claim 1, the at least one processing unit to execute the processor-executable program code to cause the system to:

receive a second plurality of item descriptions, each of the second plurality of item descriptions associated with a respective hierarchical code which includes a plurality of group codes;

extract a second respective plurality of phrases from each of the second plurality of item descriptions;

apply a second embedding generator to each of the respective plurality of phrases extracted from each of the second plurality of item descriptions to generate a multi-dimensional numerical second phrase embedding for each of the second respective plurality of phrases extracted from each of the second plurality of item descriptions;

for each of the second plurality of item descriptions, assign each second phrase embedding determined for each of the second respective plurality of phrases extracted from the item description to each of the plurality group codes included in the hierarchical code associated with the item description;

generate a second composite embedding for each of the plurality of group codes based on the second phrase embeddings assigned to the group code and a second composition algorithm; and store each second composite embedding in association with the group code for which the second composite embedding was generated.

4. The system of claim 3, the at least one processing unit to execute the processor-executable program code to cause the system to:

receive a second search query including second search terms;

apply the second embedding generator to each of the search terms to generate second multi-dimensional numerical search term embeddings;

generate a second search query composite embedding based on the second search term embeddings and the second composition algorithm;

determine a second stored composite embedding based on the second search query composite embedding;

determine a second group code of the plurality of group codes which is stored in association with the determined second stored composite embedding;

determine second item descriptions associated with the determined second group code; and generate second search results based on the second item descriptions.

5. A method comprising:

receiving a plurality of item descriptions, each of the plurality of item descriptions associated with a respective hierarchical code, wherein each respective hierarchical code which includes a plurality of group codes;

extracting a respective plurality of phrases from each item description;

applying an embedding generator to each of the respective plurality of phrases extracted from each item description to generate a multi-dimensional numerical phrase embedding for each of the respective plurality of phrases extracted from each item description;

for each item description, assigning each phrase embedding determined for each of the respective plurality of phrases extracted from the item description to each of the plurality group codes included in the hierarchical code associated with the item description;

generating a composite embedding for each of the plurality of group codes based on the phrase embeddings assigned to the group code and a composition algorithm;

storing each composite embedding in association with the group code for which the composite embedding was generated;

receiving a search query including search terms;

applying the embedding generator to each of the search terms to generate multi-dimensional numerical search term embeddings;

generating a search query composite embedding based on the search term embeddings and the composition algorithm;

determining a stored composite embedding based on the search query composite embedding;

determining a group code of the plurality of group codes which is stored in association with the determined stored composite embedding;

determining item descriptions associated with the determined group code; and generating search results based on the item descriptions.

6. The method of claim 5, further comprising:

receiving a second search query including second search terms;

applying the embedding generator to each of the second search terms to generate multi-dimensional numerical second search term embeddings;

generating a second search query composite embedding based on the second search term embeddings and the composition algorithm;

determining a second stored composite embedding based on the second search query composite embedding;

determining a second group code of the plurality of group codes which is stored in association with the determined second stored composite embeddings;

determining second item descriptions associated with the determined second group code; and generating second search results based on the second item descriptions.

7. The method of claim 5, further comprising:

receiving a second plurality of item descriptions, each of the second plurality of item descriptions associated with a respective hierarchical code which includes a plurality of group codes;

extracting a second respective plurality of phrases from each of the second plurality of item descriptions;

applying a second embedding generator to each of the respective plurality of phrases extracted from each of the second plurality of item descriptions to generate determining-a multi-dimensional numerical second phrase embedding for each of the second respective plurality of phrases extracted from each of the second plurality of item descriptions;

for each of the second plurality of item descriptions, assigning each second phrase embedding determined for each of the second respective plurality of phrases extracted from the item description to each of the plurality group codes included in the hierarchical code associated with the item description;

generating a second composite embedding for each of the plurality of group codes based on the second phrase embeddings assigned to the group code and a second composition algorithm; and storing each second composite embedding in association with the group code for which the second composite embedding was generated.

8. The method of claim 7, further comprising:

receiving a second search query including second search terms;

applying the second embedding generator to each of the search terms to generate multi-dimensional numerical second search term embeddings;

generating a second search query composite embedding based on the second search term embeddings and the second composition algorithm;

determining a second stored composite embedding based on the second search query composite embedding;

determining a second group code of the plurality of group codes which is stored in association with the determined second stored composite embedding; and generating second search results based on the second item descriptions.

9. One or more non-transitory media storing program code executable by at least one processing unit of a computing system to cause the computing system to:

receive a plurality of item descriptions, each of the plurality of item descriptions associated with a respective hierarchical code, wherein each respective hierarchical code includes a plurality of group codes;

extract a respective plurality of phrases from each item description;

apply an embedding generator to each of the respective plurality of phrases extracted from each item description to generate a multi-dimensional numerical phrase embedding for each of the respective plurality of phrases extracted from each item description;

for each item description, assign each phrase embedding determined for each of the respective plurality of phrases extracted from the item description to each of the plurality group codes included in the hierarchical code associated with the item description;

generate a composite embedding for each of the plurality of group codes based on the phrase embeddings assigned to the group code and a composition algorithm;

store each composite embedding in association with the group code for which the composite embedding was generated;

receive a search query including search terms;

apply the embedding generator to each of the search terms to generate multi-dimensional numerical search term embeddings;

generate a search query composite embedding based on the search term embeddings and the composition algorithm;

determine a stored composite embedding based on the search query composite embedding;

determine a group code of the plurality of group codes which is stored in association with the determined stored composite embedding;

determine item descriptions associated with the determined group code; and generate search results based on the item descriptions.

10. The one or more non-transitory media of claim 9, the at least one processing unit to execute the processor-executable program code to cause the system to:

receive a second search query including second search terms;

apply the embedding generator to each of the second search terms to generate multi-dimensional numerical second search term embeddings;

generate a second search query composite embedding based on the second search term embeddings and the composition algorithm;

determine a second stored composite embedding based on the second search query composite embedding;

determine a second group code of the plurality of group codes which is stored in association with the determined second stored composite embedding;

determine second item descriptions associated with the determined second group code; and generate second search results based on the second item descriptions.

11. The one or more non-transitory media of claim 9, the at least one processing unit to execute the processor-executable program code to cause the system to:

receive a second plurality of item descriptions, each of the second plurality of item descriptions associated with a respective hierarchical code which includes a plurality of group codes;

extract a second respective plurality of phrases from each of the second plurality of item descriptions;

apply a second embedding generator to each of the respective plurality of phrases extracted from each of the second plurality of item descriptions to generate a multi-dimensional numerical second phrase embedding for each of the second respective plurality of phrases extracted from each of the second plurality of item descriptions;

for each of the second plurality of item descriptions, assign each second phrase embedding determined for each of the second respective plurality of phrases extracted from the item description to each of the plurality group codes included in the hierarchical code associated with the item description;

generate a second composite embedding for each of the plurality of group codes based on the second phrase embeddings assigned to the group code and a second composition algorithm; and store each second composite embedding in association with the group code for which the second composite embedding was generated.

* * * * *